(12) United States Patent
Gold et al.

(10) Patent No.: US 8,002,993 B2
(45) Date of Patent: Aug. 23, 2011

(54) BRING YOUR OWN WATER TREATMENT SYSTEM

(76) Inventors: Maximilian Gold, Boulder, CO (US); Evan A. Thomas, Houston, TX (US)

( * ) Notice: Subject to any disclaimer, the term of this patent is extended or adjusted under 35 U.S.C. 154(b) by 0 days.

(21) Appl. No.: 12/129,026

(22) Filed: May 29, 2008

(65) Prior Publication Data

US 2008/0296227 A1    Dec. 4, 2008

Related U.S. Application Data

(60) Provisional application No. 60/932,221, filed on May 30, 2007.

(51) Int. Cl.
*B01D 37/00* (2006.01)

(52) U.S. Cl. .......... 210/748.11; 210/792; 210/804; 210/807; 210/138; 210/265; 210/275

(58) Field of Classification Search .......... None
See application file for complete search history.

(56) References Cited

U.S. PATENT DOCUMENTS

| | | | |
|---|---|---|---|
| 3,677,405 A * | 7/1972 | Keith, Jr. ............... | 210/774 |
| 3,965,004 A * | 6/1976 | Garber ................... | 210/691 |
| 4,021,347 A * | 5/1977 | Teller et al. ............ | 210/195.1 |
| 4,145,279 A * | 3/1979 | Selby, III ............... | 210/614 |
| 4,849,100 A | 7/1989 | Papandrea | |
| 5,258,121 A * | 11/1993 | Jordan et al. .......... | 210/605 |
| 5,462,674 A * | 10/1995 | Butters et al. ......... | 210/748.11 |
| 5,466,367 A * | 11/1995 | Coate et al. ........... | 210/96.1 |
| 5,593,574 A * | 1/1997 | VanToever ............. | 210/150 |
| 5,597,479 A * | 1/1997 | Johnson ................. | 210/192 |
| 5,679,257 A * | 10/1997 | Coate et al. ........... | 210/695 |
| 5,792,369 A * | 8/1998 | Johnson ................. | 210/748.12 |
| 5,843,304 A * | 12/1998 | Marchesseault et al. ..... | 210/143 |
| 5,868,927 A * | 2/1999 | Smith et al. ........... | 210/202 |
| 5,993,659 A * | 11/1999 | Schenk et al. ......... | 210/618 |
| 6,077,431 A * | 6/2000 | Kawanishi et al. ..... | 210/609 |
| 6,436,283 B1 | 8/2002 | Duke | |
| 6,802,981 B2 * | 10/2004 | Ryazanova et al. ..... | 210/726 |
| 6,916,427 B2 * | 7/2005 | Roth ...................... | 210/709 |
| 6,926,878 B2 | 8/2005 | Santina | |
| 7,153,060 B1 | 12/2006 | Bennion | |
| 2003/0205535 A1* | 11/2003 | Roth ...................... | 210/748 |
| 2008/0296227 A1* | 12/2008 | Gold et al. ............. | 210/663 |
| 2009/0176300 A1* | 7/2009 | Gallagher et al. ..... | 435/290.1 |

OTHER PUBLICATIONS

Installation, Operation and Maintenance Owner's Manual, "Sterilight silver uv disinfection," Oct. 2006, pp. 1-18, Ontario, Canada.

Triangular Wave Technologies, Inc. Fluid Management Solutions in brochure "Triangular Wave Technologies Patent Ultra-Violet Disinfection System," New Jersey, USA.

Zarges "Packaging, transportation, storage," pp. 1-99, Weilheim, Germany.

* cited by examiner

*Primary Examiner* — Robert James Popovics
(74) *Attorney, Agent, or Firm* — Edmonds & Nolte, P.C.

(57) ABSTRACT

A method and apparatus for filtering a fluid is presented. In one embodiment, the apparatus converts contaminated water into water having a lower turbidity and bacterial contamination level than the contaminated water. The apparatus includes a settling unit for at least partially settling a portion of the water; a filter unit having a filtration media; wherein the filtration media comprises sand, anthracite coal, burnt rice husks, diatomaceous earth, gravel, pumice gravel, or combinations thereof; a sanitation unit; wherein the sanitation unit is an ultraviolet disinfection unit; a backwash unit; wherein the settling unit is in fluid communications with the filter unit and the backwash unit, the backwash unit is in fluid communications with the filter unit, and the filter unit is in fluid communications with the sanitation unit; and wherein at least a portion of the settling unit is elevated above the filter unit.

5 Claims, 5 Drawing Sheets

BRING YOUR OWN WATER TREATMENT SYSTEM

CROSS-REFERENCE TO RELATED APPLICATIONS

This application claims priority to U.S. Provisional Patent Application having Ser. No. 60/932,221, filed on May 30, 2007, which is incorporated by reference herein.

BACKGROUND OF THE INVENTION

1. Field of the Invention

Embodiments of the present invention generally relate to methods and processes for water purification. More particularly, embodiments of the present invention relate to methods and processes for purifying water in remote and/or economically disadvantaged communities.

2. Description of the Related Art

Over a billion people in the world lack access to safe drinking water. Water-borne disease is a leading cause of illness in the developing world, contributing to the death of 15 million children every year, on average. Two primary measures of water cleanliness include turbidity levels and bacterial counts. While numerous technological, medical, and educational solutions have been implemented to provide better water quality for developing communities, no single solution has been able to provide water having reasonably acceptable turbidity and bacterial contamination levels for a majority of the communities where there are little or no available treatment infrastructures or surplus energy resources. There is a need therefore for a water treatment method and apparatus that directly addresses the specific constraints and requirements of poor, rural, mountainous, and/or densely populated communities. There is also a need for a water treatment method and apparatus that directly addresses the United Nations Millennium Development Goals (MDG), including reducing child mortality, improving maternal health, combating disease, ensuring environmental sustainability, and developing a global partnership for development.

SUMMARY

The following presents a general summary of several aspects of the disclosure in order to provide a basic understanding of at least some aspects of the disclosure. This summary is not an extensive overview of the disclosure. It is not intended to identify key or critical elements of the disclosure or to delineate the scope of the claims. The following summary merely presents some concepts of the disclosure in a general form as a prelude to the more detailed description that follows.

An exemplary method for converting contaminated water into water having a lower turbidity and bacterial contamination level than the contaminated water includes supplying the contaminated water to a water treatment system comprising a settling unit for at least partially settling a portion of the water, a filter unit having a filtration media, a sanitation unit, and a backwash unit, wherein the settling unit is in fluid communications with the filter unit and the backwash unit, the backwash unit is in fluid communications with the filter unit, and the filter unit is in fluid communications with the sanitation unit; and wherein at least a portion of the settling unit is elevated above the filter unit.

Disclosed is an apparatus for converting contaminated water into water having a lower turbidity and bacterial contamination level than the contaminated water including a settling unit for at least partially settling a portion of the water; a filter unit having a filtration media; wherein the filtration media includes sand, anthracite coal, burnt rice husks, diatomaceous earth, gravel, pumice gravel, or combinations thereof; a sanitation unit; wherein the sanitation unit is an ultraviolet disinfection unit; a backwash unit; wherein the settling unit is in fluid communications with the filter unit and the backwash unit, the backwash unit is in fluid communications with the filter unit, and the filter unit is in fluid communications with the sanitation unit; and wherein at least a portion of the settling unit is elevated above the filter unit.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

A detailed description will now be provided. Each of the appended claims defines a separate invention, which for infringement purposes is recognized as including equivalents to the various elements or limitations specified in the claims. Depending on the context, all references below to the "invention" may in some cases refer to certain specific embodiments only. In other cases it will be recognized that references to the "invention" will refer to subject matter recited in one or more, but not necessarily all, of the claims. Each of the inventions will now be described in greater detail below, including specific embodiments, versions and examples, but the inventions are not limited to these embodiments, versions or examples, which are included to enable a person having ordinary skill in the art to make and use the inventions, when the information in this patent is combined with available information and technology.

Figure 1:
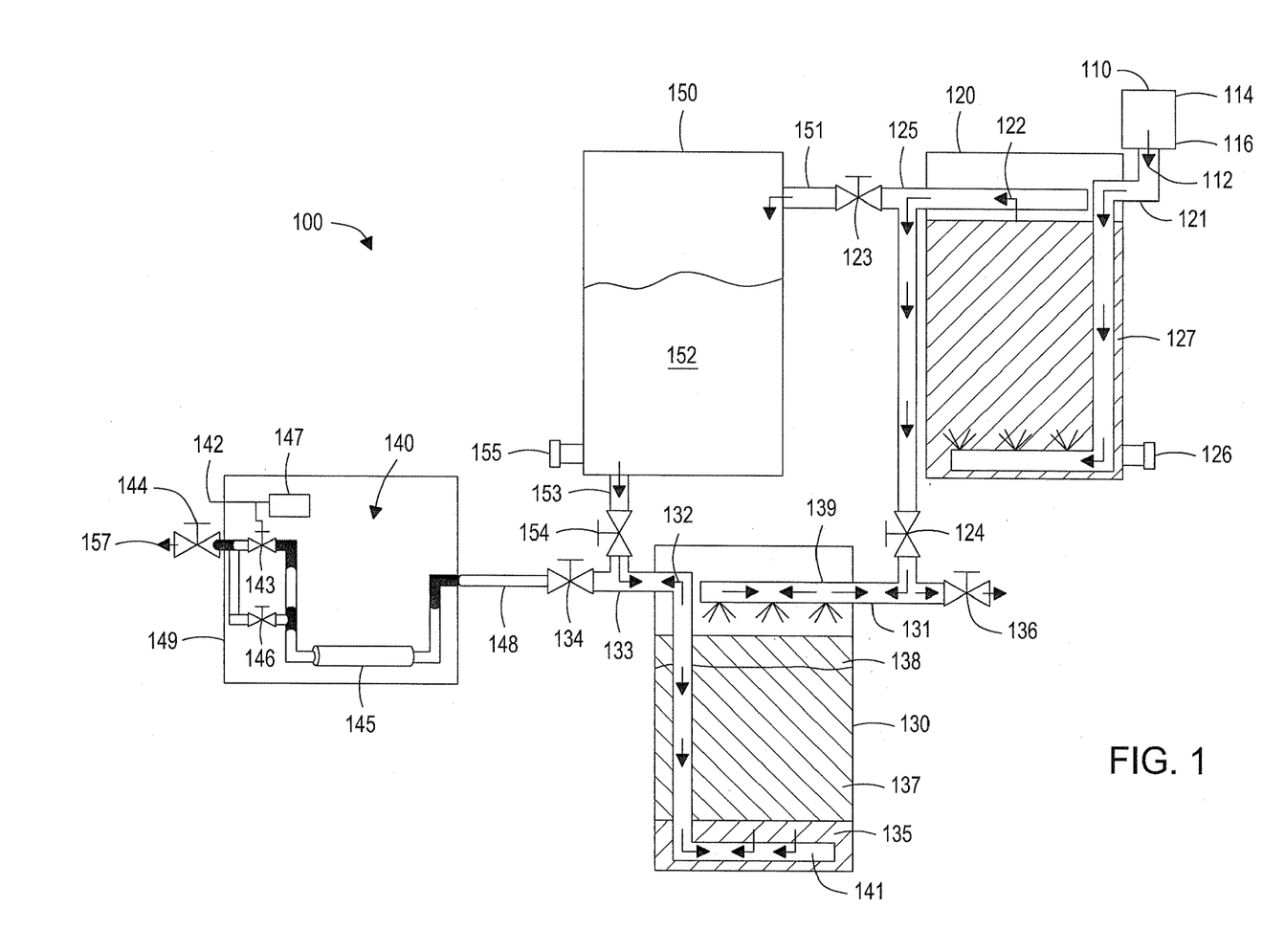
FIG. 1 depicts a schematic of an illustrative water treatment system according to one or more embodiments described.

FIG. 1 depicts a schematic of an illustrative water treatment system according to one or more embodiments described. In one or more embodiments, an illustrative water treatment system 100 can include a fluid inlet 110, a roughing separator or "settling" unit 120, a filter unit 130, a sanitation unit 140, and a backwash unit 150. The fluid inlet 110, the settling unit 120, the filter unit 130, the sanitation unit 140, and the backwash unit 150 can be in fluid communications with each other. The sanitation unit 140 can have a power source 142 and a sanitation chamber 145.

The fluid inlet 110 can be any opening, container, or vessel capable of receiving and/or communicating an input fluid 112, for example water. The fluid inlet 110 can be one or more pre-existing fluid pipelines, one or more inlets, one or more buckets, one or more funnels, one or more barrels, one or more drums, and/or one or more other containers capable of receiving and directing the input fluid 112. In one or more embodiments, the fluid inlet 110 can have an inlet end 114 and an outlet end 116.

In one or more embodiments, the settling unit 120 can be any container or vessel capable of retaining a fluid. The settling unit 120 can be one or more buckets, one or more open barrels, one or more sealed barrels, one or more open drums, one or more sealed drums, one or more plastic fifty-five gallon drums, and/or one or more other containers capable of retaining the fluid. The settling unit 120 can include a settling inlet 121 and a settling outlet 125. The settling inlet 121 can be in fluid communications with the inside and the outside of the settling unit 120. The settling inlet 121 can be in fluid communications with the outlet end 116 of the fluid inlet 110. The settling outlet 125 can be in fluid communications with the inside and the outside of the settling unit 120. The settling outlet 125 can be in fluid communications with the filter unit 130. A valve 124 can be disposed between the settling unit 120 and the filter unit 130. The settling outlet 125 can be in fluid communications with the backwash unit 150. A fluid control valve 123 can be disposed between the settling unit 120 and the backwash unit 150.

Figure 2:
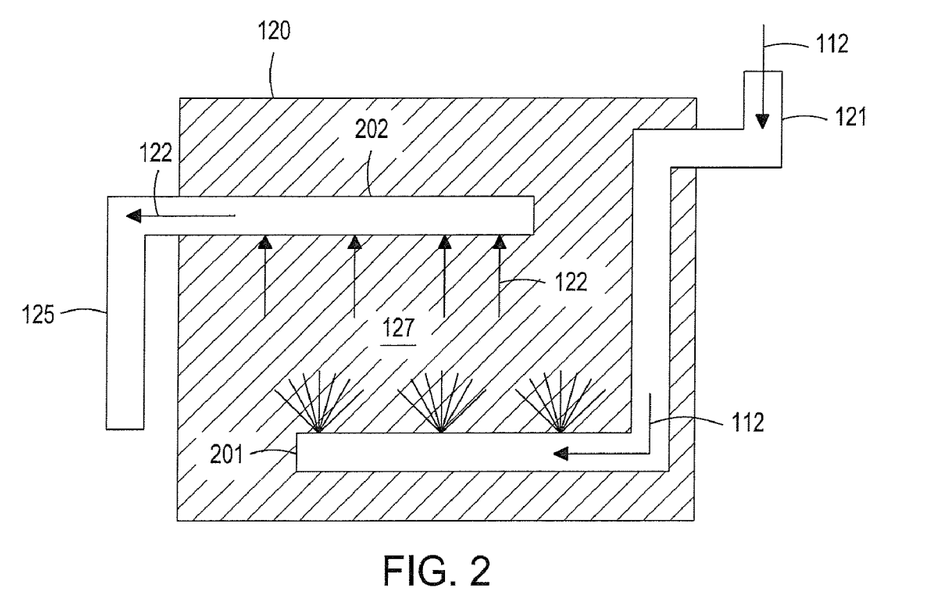
FIG. 2 depicts a schematic cross-section view of an illustrative up-flow settling unit according to one or more embodiments.

FIG. 2 depicts a schematic cross-section view of an illustrative up-flow settling unit according to one or more embodiments. In one or more embodiments, the settling unit 120 can be an up-flow settling unit known in the art and can include a settling distribution arm 201, an over-drain 202, and a gravel bed 127 disposed inside the settling unit 120. In one or more embodiments, the settling unit 120 can have the settling inlet 121 and the settling outlet 125.

Figure 3:
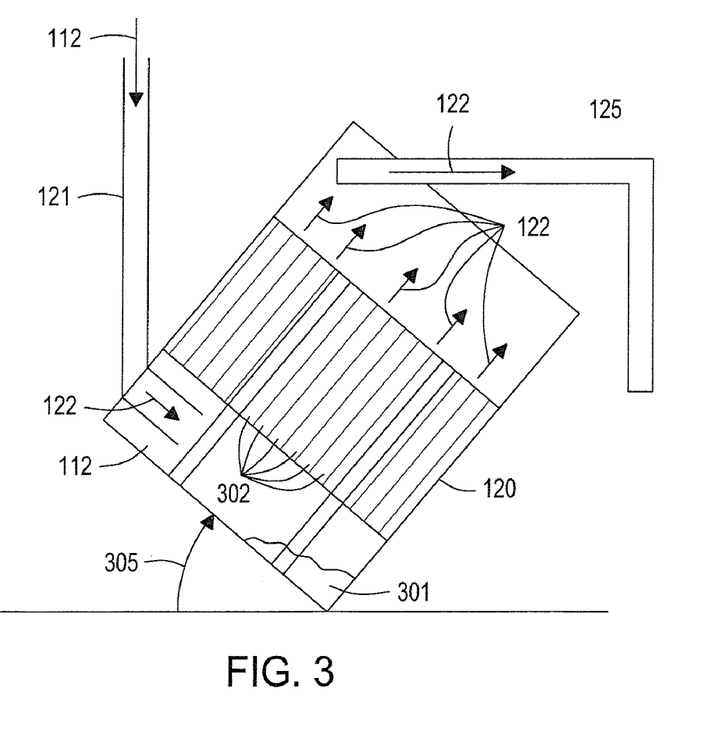
FIG. 3 depicts a schematic cross-section view of an illustrative settling unit having one or more settling tubes disposed therein according to one or more embodiments.

FIG. 3 depicts a schematic cross-section view of an illustrative settling unit having one or more settling tubes disposed therein according to one or more embodiments. In one or more embodiments, the settling unit 120 can have the settling inlet 121 and the settling outlet 125 and can include one or more settling tubes 302 disposed therein. In one or more embodiments, the settling tubes 302 can be arranged in a circular pattern or any pattern within the settling unit 120 such that a fluid can flow from the settling inlet 121 to the settling outlet 125 or vice versa.

In one or more embodiments, the settling unit 120 can be inclined at an angle 305 to accelerate the rate of settling. In one or more embodiments, the settling tubes 302 can be inclined inside the settling unit 120 at an appropriate angle to the vertical or horizontal to accelerate the rate of settling. In one or more embodiments, the settling unit 120 can be inclined at an angle 305 of about 20 degrees to about 80 degrees to the horizontal. In one or more embodiments, the settling unit 120 can be inclined at an angle 305 of about 40 degrees to about 80 degrees to the horizontal. In one or more embodiments, the settling unit 120 can be inclined at an angle 305 of about 50 degrees to about 70 degrees to the horizontal. In one or more embodiments, the settling unit 120 can be inclined at an angle 305 of about 50 degrees to about 60 degrees to the horizontal.

Referring again to FIG. 1, in one or more embodiments, the filter unit 130 can be any container or vessel capable of retaining the fluid. The filter unit 130 can be one or more buckets, one or more open barrels, one or more sealed barrels, one or more open drums, one or more sealed drums, one or more plastic fifty-five gallon drums, and/or one or more other containers capable of retaining the fluid. The filter unit 130 can include a filter inlet 131 and a filter outlet 133. The filter inlet 131 can be in fluid communications with the inside and the outside of the filter unit 130. The filter inlet 131 can be in fluid communications with the settling outlet 125 of the settling unit 120. The filter outlet 133 can be in fluid communications with a drain 141 and the inside and the outside of the filter unit 130. The filter outlet 133 can be in fluid communications with the sanitation unit 140.

In one or more embodiments, a granular based filter media can be disposed in the filter unit 130. For example, the granular based filter media can include sand, anthracite coal, burnt rice husks, diatomaceous earth, gravel, pumice gravel, and/or any other granular media available in remote areas using locally available materials. For example, the granular based filter media can be the type of filter media found in a rapid sand filter. Rapid sand filters are known in the art and typically use relatively coarse sand and other granular media to remove particles and impurities that are trapped in a fluid. In one or more embodiments, the filter unit 130 can include a layer of sand 137. In one or more embodiments, the filter unit 130 can include a layer of gravel 135 disposed below the layer of sand 137. The filter unit 130 can include a layer of pumice gravel and/or anthracite coal 138 disposed on top of the layer of sand 137 and the layer of gravel 135. In one or more embodiments, the layer of sand 137 can be prevented from entering the drain 141 by the layer of gravel 135.

In one particular example of a filter unit 130 having a granular media, the filter unit 130 can be a fifty-five gallon drum having a filter media disposed therein. The filter media can include a layer of gravel 135 that is about six inches deep and disposed below a layer of sand 137 that is about twenty-two inches deep. The layer of sand 137 can include sand with an effective size of about 0.6 mm. In one or more embodiments, the layer of sand 137 can include sand with an effective size from about 0.3 mm to about 0.9 mm. The layer of sand 137 can include sand with an effective size from about 0.4 mm to about 1.3 mm. A layer of pumice gravel 138 that is about six inches deep can be disposed above the layer of sand 137. The ratio of the depth of the layer of gravel 135 to the depth of the layer of sand 137 to the depth of the layer of pumice gravel 138 can be from about 1-to-2-to-1 to about 1-to-10-to-1. Using a granular based filter media can allow the filter unit 130 to be serviced in remote areas using locally available materials rather than using commercially produced filter media.

In one or more embodiments, the sanitation unit 140 can include an enclosure 149, an inlet valve 134, the sanitation inlet 148, a disinfection unit 145, a first flow control valve 143, a second flow control valve 146, a flow switch 142, a power source 147, and a sanitized fluid outlet valve 144. In one or more embodiments, the disinfection unit 145, the first flow control valve 143, and the second flow control valve 146 can be disposed inside the sanitation unit 140. In one or more embodiments, the sanitation inlet 148 and the sanitized fluid outlet valve 144 can be in fluid communications with the inside and the outside of the sanitation unit 140. The inlet valve 134, the sanitation inlet 148, the disinfection unit 145, the first flow control valve 143, and the sanitized fluid outlet valve 144 can be in fluid communications with each other. In one or more embodiments, the second flow control valve 146 can be in fluid communications with the inlet valve 134, the sanitation inlet 148, the disinfection unit 145, the first flow control valve 143, and the sanitized fluid outlet 144. In one or more embodiments, the flow switch 142 can be configured to operate one or more first flow control valves 143 and one or more disinfection units 145. The second flow control valve 146 can be a standard hand valve. In one or more embodiments, if the first flow control valve 143 fails, the first flow control valve 143 can be bypassed via the second flow control valve 146. In one or more embodiments, the flow switch 142 can be a push button switch. The power source 147 can be configured as a power supply controlled by the switch 142 to supply power to the one or more disinfection units 145 and the one or more first control valves 143.

In one or more embodiments, the enclosure 149 can be any container or vessel. In one or more embodiments, the enclosure 149 can be a metal box. For example, the enclosure 149 can be a water-proof aluminum box sold under the trademark name ZARGES LOGISTIK. In one or more embodiments, the enclosure 149 can be selected from the line of boxes sold under the Zarges K 475 line of moisture, vapor proof protective cases.

In one or more embodiments, the disinfection unit 145 can be an ultraviolet disinfection unit. For example, the disinfection unit 145 can be an ultraviolet disinfection unit available from R-Can Environmental Incorporated sold under the trademark name STERILIGHT ULTRAVIOLET DISINFECTION SYSTEM. The disinfection unit 145 can be an ultraviolet disinfection unit available from Triangular Wave Technologies, Inc. sold under the trademark name TRIANGULAR WAVE TECHNOLOGIES UV-4 (TWT-UV-4) ULTRAVIOLET DISINFECTION SYSTEM or any know ultraviolet disinfection unit.

In one or more embodiments, the ultraviolet disinfection unit can be configured to operate using a battery power source. For example, the STERILIGHT and TWT-UV-4 ultraviolet disinfection systems can be configured to operate using a 12V DC power source. In one or more embodiments, the ultraviolet disinfection unit can be configured to operate using one or more solar cells. Electrical energy from the one or more solar cells can be stored in one or more batteries. For example, storage can be provided by one or more 200 amphour 12-volt truck battery. The ultraviolet disinfection unit can be configured to operate using alternating current (AC) power. For example, the electrical energy from the one or more solar cells or from the one or more batteries can be converted to AC power through the use of an inverter, not shown. Other power generating sources can include wind turbines, paddle wheels, pedal generators, or other known power generating sources.

In one or more embodiments, the ultraviolet disinfection unit can include a ballast to stabilize the current flow through the ultraviolet disinfection unit. The ultraviolet lamp of the disinfection unit 145 can be enclosed in a protective quartz sleeve that is transparent to UV radiation while protecting the lamp from the fluid that can be present in the disinfection unit 145.

In one or more embodiments, the backwash unit 150 can be any container or vessel capable of retaining the fluid. The backwash unit 150 can be one or more buckets, one or more open barrels, one or more sealed barrels, one or more open drums, one or more sealed drums, one or more plastic fifty-five gallon drums, and/or one or more other containers capable of retaining the fluid. The backwash unit 150 can include the fluid control valve 123, a backwash inlet 151, a backwash outlet 153, a backwash control valve 154, and a backwash drain 155. In one or more embodiments, the backwash inlet 151, the backwash outlet 153, and the backwash drain 155 can be in fluid communications with the inside and the outside of the backwash unit 150. In one or more embodiments, the fluid control valve 123 can be in fluid communication with the backwash inlet 151. The backwash control valve 154 can be in fluid communication with the backwash outlet 153.

It should be understood that the words "retain", "retaining", or "retention" do not imply any limitations as to the retention capability of any given container or vessel in the one or more embodiments herein. For example, the fluid inlet 110, the settling unit 120, and/or the filter unit 130 are not required to perfectly retain a given fluid and can leak at least some fluid outside the water treatment system 100.

Referring again to FIG. 1, in one or more embodiments during operation, the input fluid 112 can be directed through the system 100 to produce the improved water supply 157. For example, the input fluid 112 can be water. The water can flow through at least the settling unit 120, the filter unit 130, and the sanitation unit 140 to produce an improved water supply 157 having at least lower turbidity and reduced bacteria levels than the water introduced into the system 100. In one or more embodiments, the bacteria can be reduced by orders of magnitudes over the bacteria levels of the water introduced into the system 100.

The input fluid 112 can be turbid water, bacteria-contaminated water, a rain-water, surface water and/or combinations thereof. The input fluid 112 can originate from one or more sources including but not limited to lakes, streams, collected rain-water, pooled rain water, wells, and/or municipal taps. The input fluid 112 can be introduced into the fluid inlet 110 and directed to the settling unit 120. The fluid inlet 110 can include a screen, not shown, for filtering large contaminants from the input fluid 112. In one or more embodiments, the input fluid 112 can be rough filtered before introduction to the fluid inlet 110.

The input fluid 112 can be input in a continuous stream or in batches. In one or more embodiments, a batch can include an amount of fluid contained in any size bucket or any size container. For example, water can be introduced into the fluid inlet 110 by a user who has carried about one gallon of water in a bucket from a ground water source to the fluid inlet 110. The user can introduce about five gallons of water to the fluid inlet 110 by carrying the water in a container from a water source to the fluid inlet 110.

The input fluid 112 can be introduced into the fluid inlet 110 at any rate and can be at any temperature. The input fluid 112 can be introduced at a rate of about 1 gallon per minute to about 5 gallons per minute. The maximum flow rate through the system 100 can be based on the head loss through the clean media disposed in the filter unit 130 and the height of the input over the output, for example, the height of the elevation difference between the settling unit 120 and the filter unit 130. The flow rate can be sized to match the maximum rated flowrate of the sanitation unit 150. The input fluid 112 can be introduced into the inlet 110 while the input fluid 112 has an average temperature of about 10 degrees Celsius to about 40 degrees Celsius.

After introduction to the fluid inlet 110, the input fluid 112 can enter the bottom of the settling unit 120 through the settling inlet 121. As the input fluid 112 travels up through the settling unit 120, the settling unit 120 can separate or settle entrained sediment from the input fluid 112 and produce a settled fluid 122. Settling is defined herein as the process by which particulates in a fluid settle to the bottom of a volume in which the fluid resides. Settleable solids are defined herein as the particulates that settle out of a given fluid.

In one or more embodiments, the settling unit 120 can at least partially settle the input fluid 112 prior to the fluid exiting through the settling outlet 125 as the settled fluid 122. For example, the settling unit 120 can include a gravel settling filter or an inclined tube settler, as described above with reference to FIG. 2 and FIG. 3 respectively. As the fluid travels through the settling unit 120, inherent forces, for example gravity, centripetal force, and momentum, can cause entrained sediment to sink downward and the resultant settled fluid 122 can have a lower turbidity than the input fluid 112.

In gravel settling filters, such as those described above with reference to FIG. 2, as the fluid snakes it's way through the gravel matrix, the sharp turns can cause particles to get stuck to the gravel on the outside of the individual gravel pieces, filtering some of the sediment from the water. Flocculation can also occur. For example, as the particles get stuck to the individual gravel pieces, other particles begin to flock together with those that are stuck to the gravel. As the flocks get larger, they can begin to break off the gravel and fall to the bottom of the settling unit 120, resulting in even more particles being removed from the input fluid 112 prior to exiting the settling unit 120.

In one or more embodiments, the input distribution arm 201 can be disposed inside the settling unit 120 such that some space is left between the input distribution arm 201 and the bottom of the settling unit 120. Any sinking sediment can sink below the input distribution arm 201, thereby minimizing re-entrainment. In one or more embodiments, a drain, not shown, can be disposed in the bottom of the settling unit 120. The drain can allow any accumulated sediment to be drained from the bottom of the settling unit 120.

In one or more embodiments, the sediment settled out of the input fluid 112 can collect in the sediment collection reservoir 301. The sediment in the sediment collection reservoir 301 can be removed from the settling unit 120 via an access port, not shown, disposed in the bottom or side of the settling unit 120.

Referring again to FIG. 1, the settling outlet 125 can be in fluid communications with the filter unit 130 for directing the settled fluid 122 to the filter unit 130. In one or more embodiments, the settling outlet 125 can be in fluid communications with the backwash unit 150. At least a portion of the settled fluid 122 can be selectively directed, via the fluid control valve 123, to the backwash unit 150 as a stored backwashing fluid 152. The majority of the settled fluid 122 can be directed to the filter unit 130 to remove additional contaminants and produce a filtered fluid 132.

The valve 124 can control fluid flow between the settling unit 120 and the filter unit 130. A siphon break, not shown, can be disposed between the settling unit 120 and the filter unit 130 to prevent air bubbles from impeding flow through the settling outlet 125. The siphon break can also serve to prevent water from being siphoned out of the settling unit 120 and/or the filter unit 130. In one or more embodiments, the siphon break can be an air release valve in series with a vacuum relief valve, a vertical pipe that extends above the maximum hydraulic gradient line of the settling unit 120, or any device with similar operational capabilities.

In one or more embodiments, the settled fluid 122 can be directed to the filter unit 130 via one or more conduits, illustratively shown between the settling unit 120 and the filter unit 130. The one or more conduits can be relatively small in diameter. The one or more conduits can have a diameter of about ½" or more; about ¾" or more; about 1" or more; or larger depending on the overall design parameters of the system 100. The size and number of the conduits can be selected to maximize the feed pressure to the filter unit 130. The relatively small diameter hose or piping can increase the average pressure at which the filter unit 130 can operate and/or can throttle the settled fluid 122 volume so as to increase the time the settling unit 120 can be exposed to a higher pressure so that a greater volume of the input fluid 112 can be exposed to the higher pressure. By exposing the input fluid 112 to the higher pressure, the speed of settling and filtration can be increased. This can result in a larger fraction of an individual amount of water that can be treated under the maximal head. For example, to maximize the fraction of an individual amount of water treated under the maximal head in the system 100 having a settling unit 120 with a 55 gallon capacity, elevated about 10 feet above a filter unit 130, the relatively small diameter treatment conduit can be a ½-inch vinyl hose or ½-inch plastic pipe.

In one or more embodiments, the filter unit 130 can include a plastic, water-tight fifty-five gallon drum with a removable lid (not shown). The filter media can be disposed in a central portion of the filter unit 130, between a distributor 139 and a drain 141. The distributor 139 can be in fluid communications with the filter inlet 131. The distributor 139 can be configured for removal without the use of tools to facilitate maintenance access to the filter media disposed in the filter unit 130.

In one or more embodiments, where pumice gravel and sand are used as a filter media, the layer of pumice gravel 138 can pre-filter the settled fluid 122 so as to lighten the filtration load on the layer of sand 137. The layer of pumice gravel 138 can have a larger size and lower density than the sand 137 and can float on top of the sand. By pre-filtering the settled fluid 122, the layer of pumice gravel 138 can lengthen the interval between backwashes, explained below, of the filter unit 130.

The drain 141 can be in fluid communications with the filter outlet 133. The filter outlet 133 can be in fluid communications with a sanitation inlet 148 of the sanitation unit 140. The distributor 139 can distribute the settled fluid 122 about the inside of the filter unit 130. The distributor 139 can be cross-shaped, not shown, to support an even distribution of the settled fluid 122 about the inside of the filter unit 130. Holes, not shown, can be disposed along the length of the distributor 139 to distribute the settled fluid 122 about the inside of the filter unit 130. The holes can be sized such that the size of any given hole can be proportional to the square of the distance of the given hole from the inlet of the distributor 139. The drain 141 can direct a filtered fluid 132 to the sanitation unit 140.

The filter unit 130 can be configured to significantly reduce operational maintenance. The filter unit 130 can be oversized relative to the anticipated loading rate of the system 100. For example, the anticipated loading rate of the system can be from about 100 liters per day to about 10,000 liters per day and the filter unit 130 can be oversized by a factor of from about 2 to about 50. This deviation from the traditional set of parameters for filters, for example rapid sand filters, reduces the maintenance interval of the filter unit 130 by more than an order of magnitude. This reduction in maintenance requirements allows the filter unit 130 to be maintained by a single person who can attend to the filter from about once every few weeks to about once every few months depending on usage, input fluid 112 quality, and other known factors.

In one particular example where the filter unit 130 is a rapid sand filter, a typical rapid sand filter has turbidity reduction characteristics of between 0.3 log to 0.5 log, and 0.3 log to 1 log reduction of *E. Coli*. Based on a range of inputted turbidity and E. Coli counts, the resultant anticipated performance can be calculated. These results indicate that for turbidity, the filter unit 130 anticipated performance can be a reduction of about 50% to about 70%, and for *E. Coli* between 50% and 90%.

Referring again to FIG. 1, the sanitation unit 140 can deactivate living pathogens from the filtered fluid 132 to produce an improved water supply 157. The sanitation unit 140 effectiveness is impacted primarily by the quantity and nature of particulates in the filtered water 132. The anticipated average sanitation unit 140 performance may be greater than about a 70% reduction in bacteria counts, regardless of input turbidity, and about 100% bacteria reduction at less than 50 Nephelometric Turbidity Units (NTU) input turbidity at ~4 liters per minute (lpm), and about 95% reduction at less than 30 NTU and ~30 lpm.

In one or more embodiments, the flow switch 142 can activate a ballast for proving power to the disinfection unit 145 for a timed interval, while also actuating an electrical solenoid valve, the first flow control valve 143, to allow the water flow through the system 100. In one or more embodiments, the first flow control valve 143 can be on a delay timer to allow for an ultraviolet lamp in the disinfection unit 145 to warm-up.

In one or more embodiments, the disinfection unit 145 can require a warm up period prior to disinfecting the filtered water 132. In one or more embodiments, a built-in warm up timer safeguard circuit, not shown, can be disposed in the sanitation unit 140 to prevent water flow through the disinfection unit 145 while the unit 145 is warming up. For example, the flow switch 142 can be a push button switch that, when depressed, can activate the built-in warm up timer safeguard circuit to turn on the UV light to allow for warm up, prior to allowing fluid flow through the system 100. The circuit can also automatically stop the fluid flow by closing one or more of the control valves 143 or 146 and turning off the UV light. It is possible then, using one or more embodiments, to have hands free operation of the system 100 to produce an improved water supply 157, having lower turbidity and bacterial counts, after the switch 142 is activated. It is also possible to have assurance that the UV light is warmed up prior to fluid flow and assurance that the system 100 can be shut off automatically.

In one or more embodiments, the disinfection unit 145 can disinfect about twelve liters of water per minute. In one or more embodiments, the disinfection unit 145 can disinfect about twenty liters of water per minute. The ultraviolet lamp can be designed to operate for 365 days of continuous use. In one or more embodiments, the ultraviolet lamp can be used for about one hour to about five hours per day. Temporary failure of the ultraviolet lamp should not completely disable use of the system 100, as users can still receive filtered water having a quality better than the average water quality found in remote areas where the present invention can be used.

Some manufacturers of commercial ultraviolet units do not recommend intermittent use of their ultraviolet units because intermittent use can decrease lamp lifetime. But, because the system 100 can be used for much less than 24 hours per day, it is predicted that the trade-off in lamp life versus allowing intermittent use will be acceptable.

In one or more embodiments, for a disinfection unit 145 with an approximate 40 watts draw, a solar-panel and battery combination or photovoltaic power supply can be sized to provide power to the system 100 for about seven hours per day. For example, the disinfection unit 145 can be powered by a 50 or 102 watt solar-panel power supply. In one or more embodiment, the disinfection unit 145 can sanitize at least from about 5,000 liters per day to about 28,000 liters per day or more. The photovoltaic power supply system can be designed to account for losses from temperature, wiring, and battery, charge controller and inverter efficiencies. The losses due to temperature can be obtained by determining the average temperature and peak sun hours in the location where the system 100 can be deployed. The United States National Aeronautics and Space Administration (NASA) maintains a website, called the surface solar energy website, that contains average temperature and peak sun hours for locations throughout the world.

The filter unit 130 may require cleaning from time to time. In one or more embodiments, as water travels through the filter unit 130, contaminants can accumulate in the voids between the media granules disposed in the filter unit 130 and eventually increase the pressure drop through the filter unit 130, preventing it from passing fluid at an acceptable rate. At this point, the filter unit 130 can be backwashed to remove the accumulation of contaminants and allow the filter unit 130 to pass and filter fluid again. This backwashing action can be achieved by discharging an amount of water from the backwash unit 150 through the filter unit 130, in the opposite direction of normal filtration flow. By passing a volume of water through the filtration media disposed in the filter unit 130 in the opposite direction of normal filtration flow, accumulated debris in the filter media layers can be washed away by fluidization. Fluidization is the process of flowing a fluid in the opposite direction of the normal flow to fluidize the filter media and place the contaminants in suspension to lift them off the media and force the contaminants out of the filter unit 130. The media in the filter unit 130 is typically more dense than the contaminants and will tend to stay in the filter unit 130 while the contaminants are washed away by the turbulent flow process.

To achieve this effect without a pump, the system 100 can be installed with an elevation differential between the backwash unit 150 and the filter unit 130. For example, the backwash unit 150 can be elevated from about 6 feet to about 18 feet above the filter unit 130. The hydrostatic head generated by this elevation differential along with relatively large diameter conduits directing the flow between the backwash unit 150 and the filter unit 130 can be used to power the backwashing. For example, in a system 100 that includes a filter unit 130 having a volume of about 55 gallons, the elevation and conduit size for directing fluid from the backwash unit 150 to the filter unit 130 can be sized to create a flow rate of about 25 gallons per minute through the filter unit 130 during the backwash process.

In one or more embodiments, the fluid control valve 123 can be disposed between the settling outlet 125 and the backwash inlet 151 for directing at least a portion of the settled fluid 122 into the backwash unit 150. The fluid control valve 123 can be any device capable of diverting at least a portion of the settled fluid 122 to the backwash unit 150. For example, the fluid control valve 123 can be a valved branch in the plumbing between the settling unit 120 and the backwash unit 150. The valved branch can act as a weir, shunting a fraction of each input slug of fluid coming from the settling unit 120 to the backwash unit 150. The amount of water flowing into the backwash unit 150 can be controlled by the degree of aperture of the valve 123.

In one or more embodiments, the settling outlet 125 and the backwash inlet 151 can be one or more tube segments that can direct the fluid between the settling unit 120 and the backwash unit 150. The fluid control valve 123 can be disposed anywhere along the length of the one or more tube segments between the settling unit 120 and the backwash unit 150 and can constrict flow between the settling unit 120 and the backwash unit 150.

In one or more embodiments, the fluid control valve 123 can be replaced by a circular plate disposed in the fluid flow path between the settling unit 120 and the backwash unit 150. The circular plate can constrict flow between the settling unit 120 and the backwash unit 150. The circular plate can have an aperture disposed therein. The aperture can be any shape and can act as a weir between the settling unit 120 and the backwash unit 150. For example, the aperture can be shaped like an oval, a "v", a keyhole, a circle, a half-moon, or any shape.

In one or more embodiments, all of the flow through the system 100 can be induced using gravitational forces by elevating at least the fluid inlet 110 and the settling unit 120 above the filter unit 130. For example, the fluid inlet 110, the settling unit 120, and the backwash unit 150 can be elevated from about 4 feet to about 18 feet above the filter unit 130 and the sanitation unit 140. The fluid inlet 110, the settling unit 120, and the backwash unit 150 can be elevated from about 8 feet to about 18 feet above the filter unit 130. In one or more embodiments, the fluid inlet 110, the settling unit 120, and the backwash unit 150 can be elevated from about 8 feet to about 12 feet above the filter unit 130.

By elevating the fluid inlet 110 and the settling unit 120 above at least the filter unit 130, the filter unit 130 can operate under hydrostatic pressure to maximize filtration speed. For example, the settling unit 120 and the filter unit 130 can be sized as two fifty-five gallon containers in fluid communications via a ½ inch diameter tube. When the elevation between the settling unit 120 and the filter unit 130 is from about 13 feet to about 16 feet, the filter unit 130 can operate at a maximum pressure of about 14 feet of water (6 psi, 41 kPa) to produce a speed of treatment through the system 100 of about 10 liters per minute to about 15 liters per minute. The system 100 can provide from about 5,000 liters to about 10,000 liters of treated water per. While typical filters have pretreatment processes or other types of influent control, in one or more embodiments the filter unit 130 influent can be quite variable with the only pretreatment process being the settling unit 120.

Using gravitational forces can eliminate the need for motors or pumps, eliminating the need for energy sources such as fossil fuels or municipality provided electricity. Eliminating motors and pumps can be a significant advantage in remote locations where fossil fuels and other energy sources can be scarce. Eliminating motors and pumps can also reduce the carbon foot-print that would be associated with a water filtration system or apparatus that requires pumps and/or motors for inducing fluid flow.

In one or more embodiment, the system 100 can be initially charged by adding water to the inlet 110 until at least some water flows from the sanitized fluid outlet 144. After initial charging of the system 100, the system 100 can be used to filter a batch of water. For example, a batch of water can be introduced to the inlet 110. The act of adding water can provide the hydraulic energy needed to drive the water through the system 100. The flow switch 142 can be actuated to begin the flow of the fluid through the system 100. Upon activation of the flow switch 142, an amount of improved water supply 157, roughly equivalent to the amount of water in the batch minus a small donation to the backwash unit 150, can be received from the sanitation unit 140. Because system 100 pressurization can be provided by each batch of water added, the amount of improved water supply 157 delivered to the user can be limited to no more than the amount introduced. This can prevent users from taking more water than they have provided to the system 100. In one or more embodiments, it is not possible to take more water out of the system 100 than a user puts in. In one or more embodiments, water will only come out of the sanitized fluid outlet 144 if the system 100 is being driven by the addition of water from a user. Additionally, the treated water can be delivered within minutes, because the system 100 is already primed and pressurized with water added by previous users.

In one or more embodiments, the system 100 can serve as a water reservoir. For example, the system 100 can be primed and then an amount of water can be added to the fluid inlet 110. The fluid inlet 110 can be sized to hold an amount of water sufficient to meet the needs of a community for a period of time, for example one day. When someone in the community wants water, the water can be filtered and withdrawn from the system 100 through out the day.

The system 100 can be designed to provide a high volume of water to residents currently drinking turbid and bacteria-contaminated water. The system 100 may not always bring water quality up to first world standards, but rather can quickly increase the quality of water for residents accustomed to drinking water of poor quality. The goal is to get from "bad" quality water (more than 1,000 fecal coliform per 100 milliliters) to "moderate" quality water (less than 10 fecal coliforms per 100 milliliters), not necessarily to meet the stringent quality standards of industrial countries. Additionally, the system 100 does not have to replace all sources of water for the residents in remote areas.

One of the innovative aspects of the system 100 is that the energy required to drive the system 100 both nominally and in backwash operation can be provided by gravity and the sun. In one specific example, the cumulative result can be a system 100 that can treat a five-gallon bucket (about 20 liters) of water in about two minutes using only solar power and gravity.

Example One

A field unit was produced and tested: The field unit included a fluid inlet 110, a settling unit 120, a filter unit 130, a sanitation unit 140, and a backwash unit 150. The fluid inlet 110, the settling unit 120 and the backwash unit 150 were elevated about 10 feet above the filter unit 130 and the sanitation unit 140. During nominal operations, water treatment with the field unit began when a user poured water from a container into the inlet 110. The user then carried the now-empty container down to the output side of the sanitation unit 140. The user placed the container under the sanitized fluid outlet 144 and activated the flow switch 142. Treatment took about two minutes for a typical 20-liter jerry can of water. Untreated water droplets remaining in the user's bucket were diluted with many liters of treated water.

Because treatment water was stored in the field unit, users did not receive the same water that they poured into the inlet 110. Rather, the user's added water served to displace a nearly equal volume of water through the field unit. After proving that the field unit as described above would flow water successfully, additional testing was performed to show the effectiveness of at least one embodiment of the system 100.

Example Two

First, a salt tracer study was conducted to characterize the residence time of the processed water in each of the treatment stages 120, 130, and 140, with reference to Example One above. The tracer study involved inputting ~12 g NaCl/liter water solution into one embodiment of the present invention at 9 lpm for 55 minutes, then switching to clean water. The conductivity 410 of the influent, the conductivity 420 of the fluid post settling unit 120, the conductivity 430 of the fluid post filter unit 130, and the conductivity 440 of the fluid post sanitation unit 140 were taken every five minutes.

Figure 4:
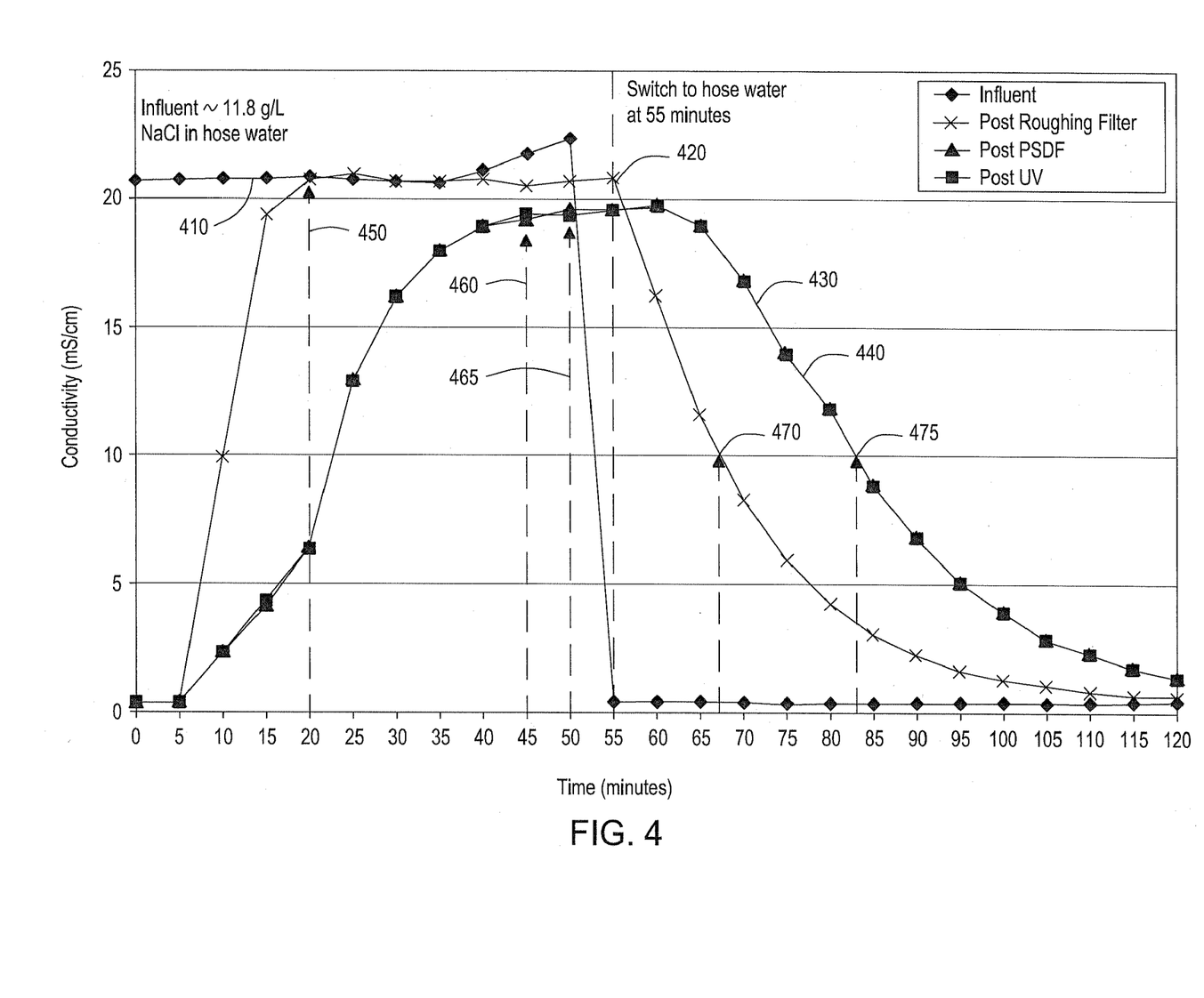
FIG. 4 depicts a graph of the results of the salt-water tracer study performed on at least one embodiment of the present invention.

FIG. 4 depicts a graph of the results of the salt-water tracer study performed on at least one embodiment of the present invention. These results indicate that at a flow rate of 9 liter per minute, the settling unit 120 residence time 450 was approximately 20 minutes, while the filter unit 130 residence time 460 was approximately 25 minutes. The sanitation unit 140 residence time 465 was approximately five minutes. After the clean water was started at approximately fifty-five minutes, the time 470 to reduce the salt concentration in the settling unit 120 to about half what it was prior to adding clean water to the system was about twelve minutes. The time 475 to reduce the salt concentration in the filter unit 130 to about half what it was prior to adding clean water to the system was about twenty-six minutes. Estimates were made on the amount of time needed for each subsequent stage to reach a steady conductivity, indicative of salt concentration. These results were important to consider when designing the long-term test described below, with reference to FIGS. 5-6, such that test points of effluent accurately reflect influent water treated.

The system under test was then challenged with activated sludge, a byproduct of wastewater treatment, as the primary contaminant in the influent water. Activated sludge was used because it is primarily bacteria flocs, and therefore the turbidity in the water tracks bacterial contamination well. This long-term test involved an automated batch dosing system that mixed activated sludge with clean water and then pumped the mixture into the system under test at a rate of approximately seven liters per minute. Each batch was approximately 100 liters, and around seven batches were run per day separated by two hour intervals. In total, about 8,800 liters of wastewater at around 75 NTU (measured with a Hach 2100P Turbidimeter) was pumped into the system 100 over ten days. The test was stopped when the effluent flowrate had reduced to about one-third of a liter per minute because of media fouling. Turbidity results for this test are presented in FIG. 5. E. Coli colony forming unit (CFU/ml) results (collected with 3M Petrifilm plates) are presented in FIG. 6.

Figure 5:
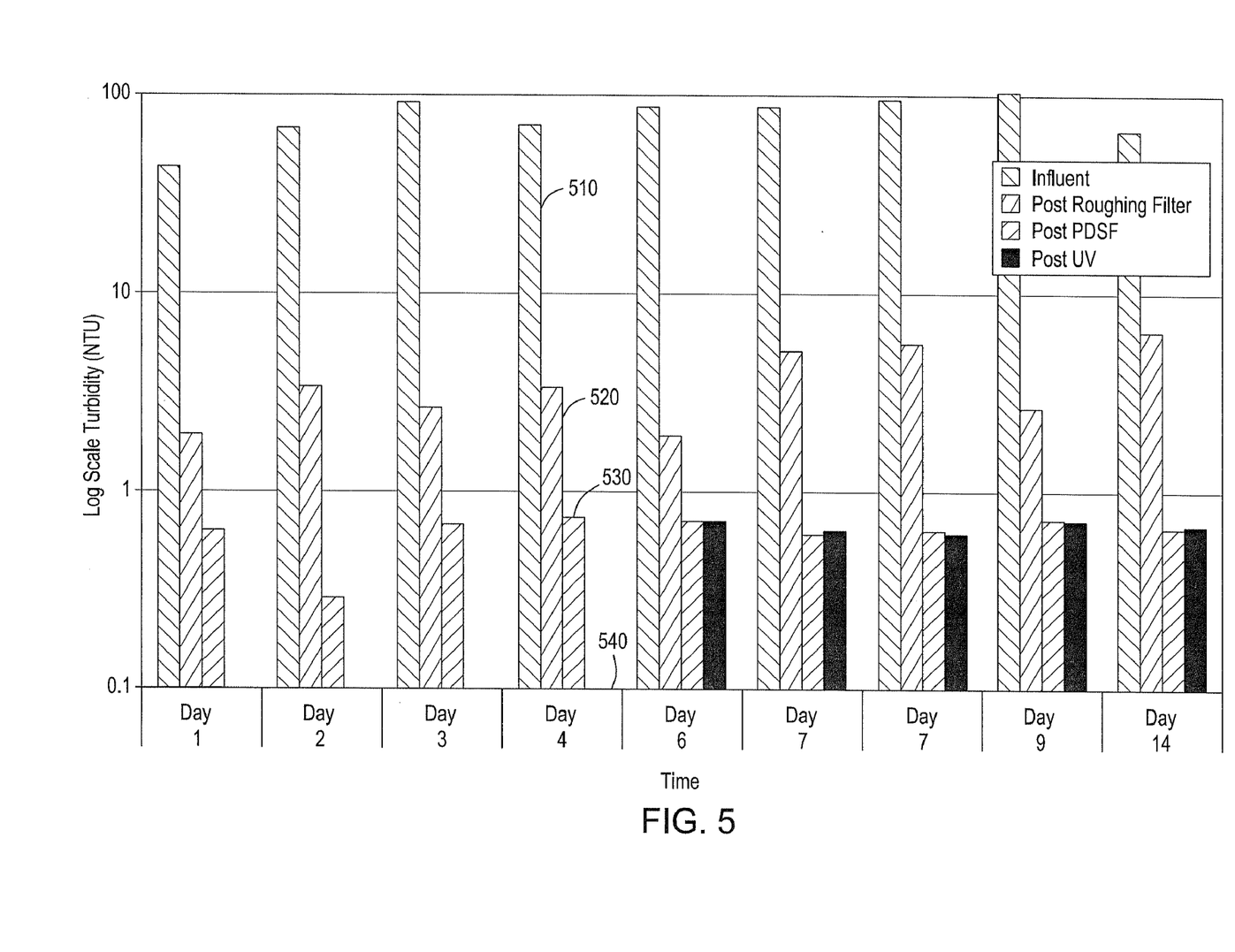
FIG. 5 depicts a graph of the turbidity reduction performance of at least one embodiment of the present invention.

FIG. 5 depicts a graph of the turbidity reduction performance of at least one embodiment of the present invention. The turbidity 510 for the influent was between about 50 and 100 NTU. The results show that the settling unit 120 can perform most of the filtration as indicated by the turbidity 520 of the water after the settling unit 120. The filter unit 130 can successfully finish the filtration to bring the turbidity 530 down to less than one NTU. This can be explained by the batch nature of the process wherein particulates are introduced to the settling unit 120 and allowed to settle below the distributor 139 between batches.

Figure 6:
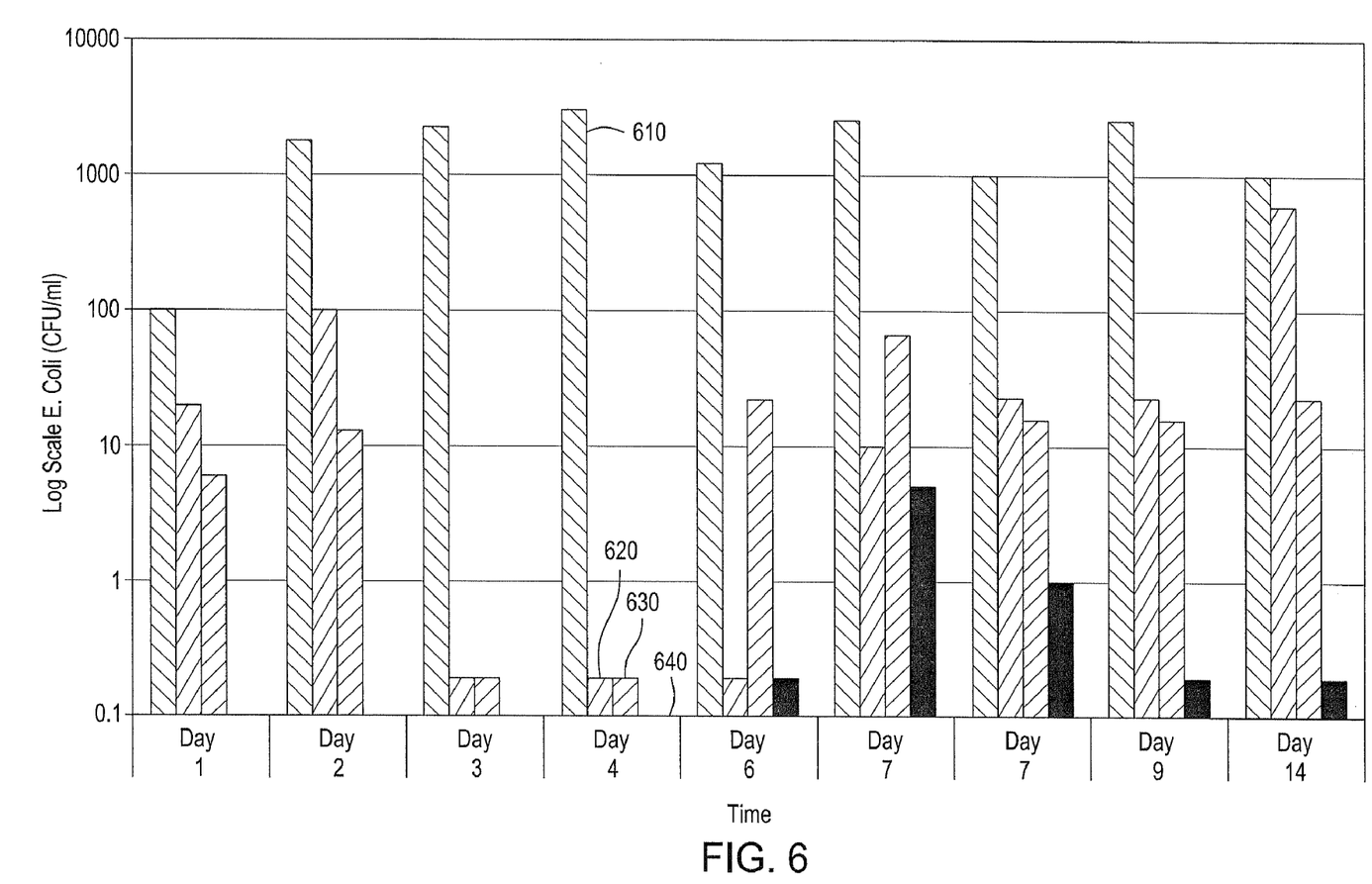
FIG. 6 depicts a graph of the bacteria reduction performance of at least one embodiment of the present invention.

FIG. 6 depicts a graph of the bacteria reduction performance of at least one embodiment of the present invention. The E-coli level 610 of the influent was measured as well as the E-coli levels 620, 630, and 640 which were taken post settling unit 120, post filter unit 130, and post sanitation unit 140 respectively. The UV light in the sanitation unit 140 is shown to successfully deactivate most of the remaining bacteria having a measured turbidity 540 of zero during the first four days of testing. The bacteria results show that the system 100 can consistently bring the concentration of bacteria down from several thousand colonies per milliliter of water 610 to two or less 640.

A backwash of the system was then performed with water that had been diverted to the backwash unit 150 during a previous test from the settling unit 120, as is nominal operation. The diverted water was left to sit in the backwash unit 150 for several weeks. The turbidity of the water in the backwash unit 150 was 2.24 NTU before backwashing. This water was then run through the filter unit 130. The system was then switched back to nominal operation, and run at seven liters per minute. The effluent water from the filter unit was immediately 0.98 NTU, falling to 0.72 NTU after 1.5 minutes, 0.68 after 3 minutes, and 0.36 after 5 minutes. These results indicate that minimal flushing volume is needed to maintain filter unit 130 performance at less than 1 NTU after backwashing.

Example Three

Another field test was performed in a remote village in Africa to check the performance of a representative water filtration system under actual operational conditions. The field test was conducted in September and October of the year 2007 in the community of Mungonero. Referring to FIG. 1, a field system was constructed having a fluid inlet 110, a settling unit 120, a filter unit 130, a sanitation unit 140, and a backwash unit 150. The fluid inlet 110, the settling unit 120 and the backwash unit 150 were elevated about 10 feet above the filter unit 130 and the sanitation unit 140. The people of the community of Mungonero carried water, on a daily basis, to the inlet 110 of the representative water filtration system and received from the representative system an improved water supply 157 approximately equal in volume to the amount they added to the representative system. Several test samples were taken over the test period.

During the field test in Mungonero, the Turbidity of the rainwater was consistently improved to about 2 NTU by filtering the rainwater through the representative system. Over time, even though the coliforms and E. Coli colonies were present and/or increasing in the rainwater, the representative water filtration system eliminated all coliforms and E. Coli from the resultant improved water supply 157. These results show that the representative water filtration system performed very well for improving both turbidity and bacterial contamination. By effectively improving the water quality measures of turbidity and bacterial contamination, the representative water filtration system shows that one or more of the embodiments of the system 100 described herein can effectively provide water having an improved quality.

One unexpected result from using the one or more embodiments described herein is that the turbidity of the water after filtration can be above 1 NTU and the filtered water can still be bacterial de-contaminated. Another unexpected result from using the one or more embodiments described herein is that the system 100 still provides acceptably drinkable water after backwash with water that has only been settled in the settling unit 120. Conventional practice is to backwash filtration units similar to the filter unit 130 using very clean water. Another unexpected result from using the one or more embodiments described herein is that the up-flow settling unit 120 depicted in FIG. 2 above can act as a flocculator, a settling unit, and a filtration unit in one.

Certain embodiments and features have been described using a set of numerical upper limits and a set of numerical lower limits. It should be appreciated that ranges from any lower limit to any upper limit are contemplated unless otherwise indicated. Certain lower limits, upper limits and ranges can appear in one or more claims below. All numerical values are "about" or "approximately" the indicated value, and take into account experimental error and variations that would be expected by a person having ordinary skill in the art.

Various terms have been defined above. To the extent a term used in a claim is not defined above, it should be given the broadest definition persons in the pertinent art have given that term as reflected in at least one printed publication or issued patent. Furthermore, all patents, test procedures, and other documents cited in this application are fully incorporated by reference to the extent such disclosure is not inconsistent with this application and for all jurisdictions in which such incorporation is permitted.

While the foregoing is directed to embodiments of the present invention, other and further embodiments of the invention may be devised without departing from the basic scope thereof, and the scope thereof is determined by the claims that follow.

What is claimed is:

1. A method for converting contaminated water into water having a lower turbidity and bacterial contamination level than the contaminated water comprising the steps of:
    supplying the contaminated water to a water treatment system comprising:
        an upflow settling unit for at least partially settling a portion of the contaminated water;
        a filter unit having a granular filtration media selected from the group consisting of sand, anthracite coal, burnt rice husks, diatomaceous earth, gravel pumice gravel and combinations thereof;
        a sanitation unit comprising an ultraviolet disinfection unit; and
        a backwash unit, wherein at least a portion of the settling unit is elevated above an inlet to the filter unit and is in fluid communication with the filter unit and the backwash unit, at least a portion of the backwash unit is elevated above the filter unit and is in fluid communication with the filter unit, and the filter unit is in fluid communication with the sanitation unit;
    settling the contaminated water through the upflow settling unit and filtering the resulting settled water through the filter unit at a flow rate of about 3.5 liters per minute to about 15 liters per minute;
    selectively directing at least a portion of water exiting the settling unit to the backwash unit after settling;
    sanitizing water exiting the filter unit in the sanitation unit at a flow rate of about 3.5 liters per minute to about 15 liters per minute;
    recovering a water having a lower turbidity and lower bacterial contamination than the contaminated water, wherein the contaminated water is passed through the settling unit, the filter unit, and the sanitation unit using gravitational forces; and
    backwashing the filter unit using the water selectively directed to the backwash unit.

2. The method of claim 1, wherein the contaminated water is supplied to the water treatment system one batch at a time.

3. The method of claim 1, wherein the ultraviolet disinfection unit is powered using a solar power energy source.

4. The method of claim 1, wherein the upflow settling unit and the backwash unit are elevated above the filter unit.

5. The method of claim 1, further comprising an electronic timer circuit having the capability to control the ultraviolet disinfection unit and the flow of water through the water treatment system.

* * * * *